(12) United States Patent
Hyp et al.

(10) Patent No.: US 6,313,869 B1
(45) Date of Patent: Nov. 6, 2001

(54) J NOZZLE ARTICULATING CAMERA SYSTEM

(76) Inventors: Edward J. Hyp, 11169 Larwin La., Irwin, PA (US) 15642; William J. Habermann, 27 Ironia Rd., Flanders, NJ (US) 07836

( * ) Notice: Subject to any disclaimer, the term of this patent is extended or adjusted under 35 U.S.C. 154(b) by 0 days.

(21) Appl. No.: 09/264,873

(22) Filed: Mar. 9, 1999

(51) Int. Cl.$^7$ ................. H04N 7/18; H04N 9/47
(52) U.S. Cl. ................. 348/84; 348/82; 348/83; 348/85
(58) Field of Search ................. 348/82–85; 73/865.8

(56) References Cited

U.S. PATENT DOCUMENTS

| | | | |
|---|---|---|---|
| 3,761,623 | 9/1973 | Hara et al. ............. | 348/84 |
| 4,246,604 | 1/1981 | Hundertmark et al. ..... | 348/84 |
| 4,286,287 | * 8/1981 | Williams ............... | 348/83 |
| 4,424,531 | 1/1984 | Elter et al. ............. | 348/84 |
| 4,432,931 | * 2/1984 | Lockett ................ | 376/248 |
| 4,651,558 | * 3/1987 | Martin et al. ........... | 73/40.5 R |
| 4,677,472 | 6/1987 | Wood .................. | 348/84 |
| 4,855,838 | 8/1989 | Jones et al. ............. | 348/84 |
| 5,084,764 | 1/1992 | Day .................... | 348/84 |
| 5,090,259 | * 2/1992 | Shishido et al. ......... | 73/866.5 |
| 5,195,392 | 3/1993 | Moore et al. ........... | 73/866.5 |
| 5,457,288 | 10/1995 | Olsson ................. | 348/84 |
| 5,604,532 | * 2/1997 | Tillmanns .............. | 348/84 |
| 5,612,499 | * 3/1997 | Andrew et al. .......... | 73/866.5 |
| 5,903,306 | * 5/1999 | Heckendorn et al. ...... | 348/85 |
| 6,111,600 | * 8/2000 | McLeod et al. .......... | 348/84 |

FOREIGN PATENT DOCUMENTS

| | | | |
|---|---|---|---|
| 511934 | 11/1992 | (EP) | F16L/55/18 |
| 4-188098 | 7/1992 | (JP) | G21F/7/02 |
| 10221257 | * 8/1998 | (JP) | G02B/23/00 |

* cited by examiner

*Primary Examiner*—Vu Le
(74) *Attorney, Agent, or Firm*—Richard C. Litman

(57) ABSTRACT

An apparatus for inspecting feedwater piping in a steam generator having "J" nozzles. A camera and light source are coupled to a yoke mounted rotatable wheel adjacent the end of an elongated flexible conduit. Control cables, for rotating the wheel, extend through the yoke and the conduit and are fastened to a second rotatable wheel. Rotation of the second wheel causes rotation of the first wheel along with the camera and light source. Control cables for the camera and light source also extend through the yoke and the flexible conduit.

9 Claims, 2 Drawing Sheets

J NOZZLE ARTICULATING CAMERA SYSTEM

BACKGROUND OF THE INVENTION

1. Field of the Invention

The present invention relates generally to inspection systems. More specifically, the present invention is drawn to a video camera system for inspecting the internal surfaces of pipes or vessels having interiors with limited accessibility.

2. Description of the Related Art

In a pressurized-water, nuclear-powered, electric generating system, the heat generated by a nuclear reactor is absorbed by a primary coolant that circulates through the reactor core and is utilized to transfer heat and produce steam inside the steam generator. The steam generator usually is an upright cylindrical pressure vessel with hemispherical end sections. To balance the water level inside the steam generator, a feedwater inlet-and-ring assembly introduces new water volume to offset the water loss in the steam production cycle. The feedwater is introduced from the ring assembly through "J" nozzles. "J" nozzles, which are well known in the art, are curved pipes positioned at intervals on top of the ring assembly. Typically, the nozzles are installed by drilling out the ring assembly and welding in the "J" nozzle. The ring section is usually assembled in segmented, weld-prepared sections. This assembly technique requires that backup rings are inserted in the ring assembly to establish a reinforcing structure for supporting the weld when the ring sections are assembled. Over time, the backup rings begin to erode due to the flow and velocity of the water churning through the ring assembly. Sections of the backup ring can break away and exit through the "J" nozzles. These breakaway sections are now free to wreak havoc by banging and vibrating against the steam generator tubes causing damage or rupture. The same scenario has been documented with "J" nozzle welds which have eroded and allowed the nozzles to become loose projectiles inside the steam generator.

The above scenarios have necessitated the need for efficient and effective inspection of the feedwater piping without loss of schedule, while also limiting the time for inspection to prevent unnecessary radiation dosage.

The current standard in the industry for inspection is the videoprobe. There are, however, inherent problems in its use. Videoprobes are relatively expensive, difficult to use, easily broken, costly to repair, and inspections are time consuming, using up radiation dosage. Also, the supply and repair are monopolized by a small number of companies. Videoprobes also magnify the viewed subject many times its size, depending on the distance the probe is from the viewed subject. Low lighting levels require that the viewed piping section be no more than 1–2 inches from the probe's camera and orientation of the probe in the piping interior is difficult to determine. Videoprobes also make no provision for interchanging camera lenses and light reflectors.

Other prior art devices for inspecting interior pipe surfaces are disclosed in U.S. Pat. No. 3,761,623 (Hara et al.), U.S. Pat. No. 4,246,604 (Hundertmark et al.), U.S. Pat. No. 4,424,531 (Elter et al.), U.S. Pat. No. 4,677,472 (Wood), U.S. Pat. No. 4,855,838 (Jones et al.), U.S. Pat. No. 5,084,764 (Day), U.S. Pat. No. 5,195,392 (Moore et al.), U.S. Pat. No. 5,457,288 (Olsson); EPO Patent 511,934, and Japanese Patent 4-188,098.

None of the above inventions and patents, taken either singularly or in combination, is seen to disclose an articulating camera system with variable lighting and interchangeable lens capability as will be described and claimed in the instant invention.

SUMMARY OF THE INVENTION

The present invention is an inspection system for the inner surfaces of pipes and vessels. The system comprises a high-resolution, miniature video camera and lighting arrangement which are disposed on a first rotatory wheel, which wheel is mounted on a yoke positioned at the distal end of a flexible umbilical-type conduit. The camera is designed with interchangeable lens capability which enhances the system's ability to adequately resolve the subject matter image so that minute details can be magnified. The lighting arrangement is provided with variable intensity adjustment control. The light reflectors are also interchangeable to enhance interior viewing. Up and down arcuate movement of the camera and light is accomplished through two control cables connected to the first rotatory wheel. The control cables are funneled through the yoke and the umbilical-type conduit to a second rotatory wheel positioned at the control end of the conduit. The yoke and conduit also bundle camera and light control cables. A control rod is connected to the second rotatory wheel. Arcuate vertical 180 degree movement of the camera and light is accomplished by moving the control rod in a 0–180 degree arc. Horizontal movement is accomplished by simply rotating the entire umbilical conduit.

The present invention results in a cost-effective, repairable inspection system that is durable, efficient, and will cut inspection time to a minimum in regard to schedule and radiation dosages.

Accordingly, it is a principal object of the invention to provide an improved system for inspecting the interior surfaces of pipes and vessels.

It is another object of the invention to provide an improved inspecting system which incorporates a high resolution miniature camera with interchangeable lenses.

It is a further object of the invention to provide an improved inspecting system which incorporates a lighting arrangement with variable intensity control and interchangeable reflectors.

Still another object of the invention is to provide an improved inspecting system that utilizes a unique device for orienting a camera and light.

It is an object of the invention to provide improved elements and arrangements thereof for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
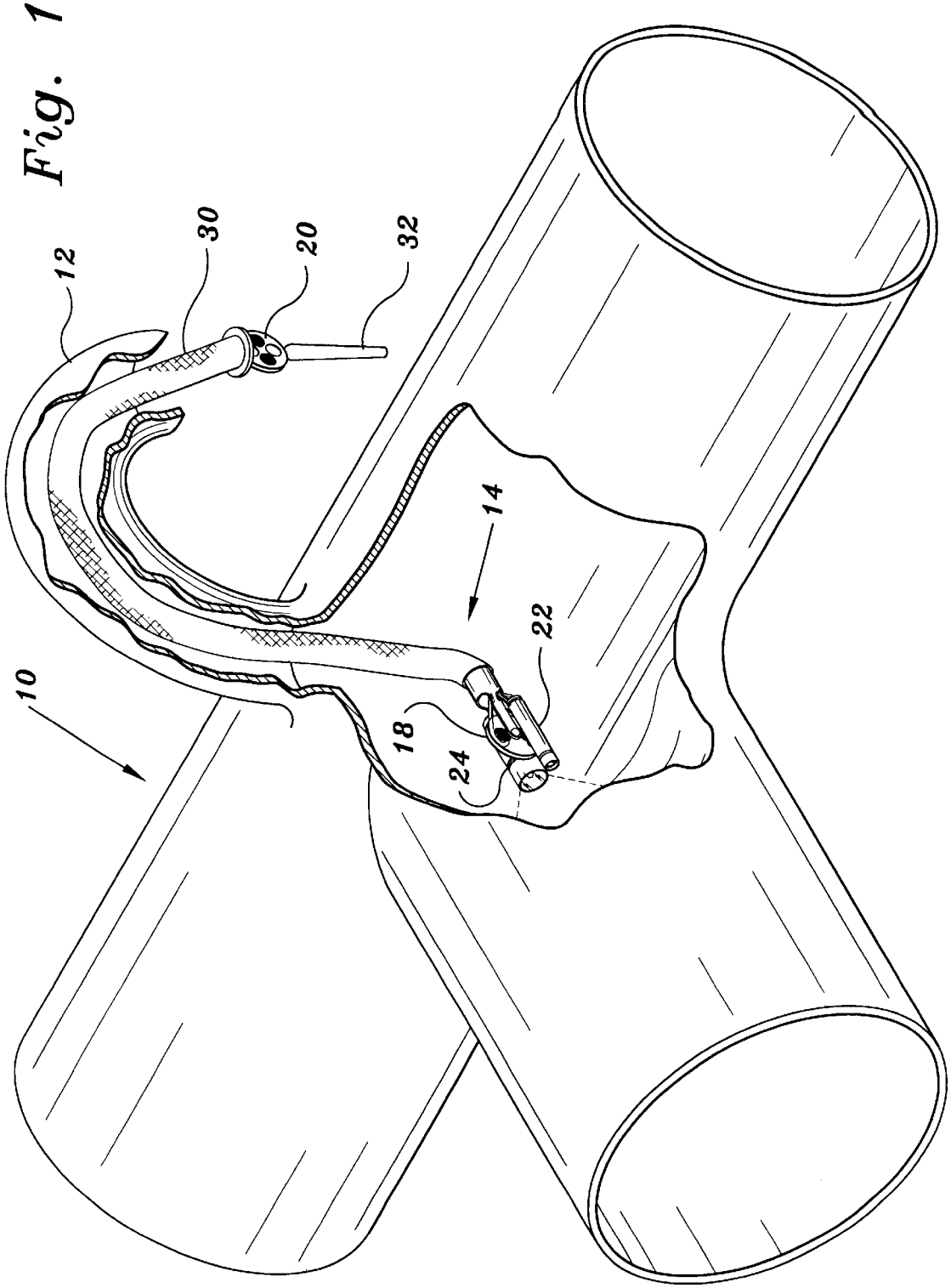
FIG. 1 is an environmental view, partly sectioned, of a "J" nozzle articulating inspection system according to the present invention.

Referring to FIG. 1 of the drawings, a single segment of steam generator feedwater ring piping is indicated generally at 10. Segment 10 has "J" nozzle 12 welded thereto as is well known in the art. Apparatus 14 for inspecting the interior of the piping is inserted through nozzle 12 as shown. Apparatus 14 comprises identical inner and outer rotatory wheels 18 and 20. A miniature camera 22 and a miniature light 24 are respectively attached to opposite sides of inner wheel 18 for rotation therewith.

Figure 2:
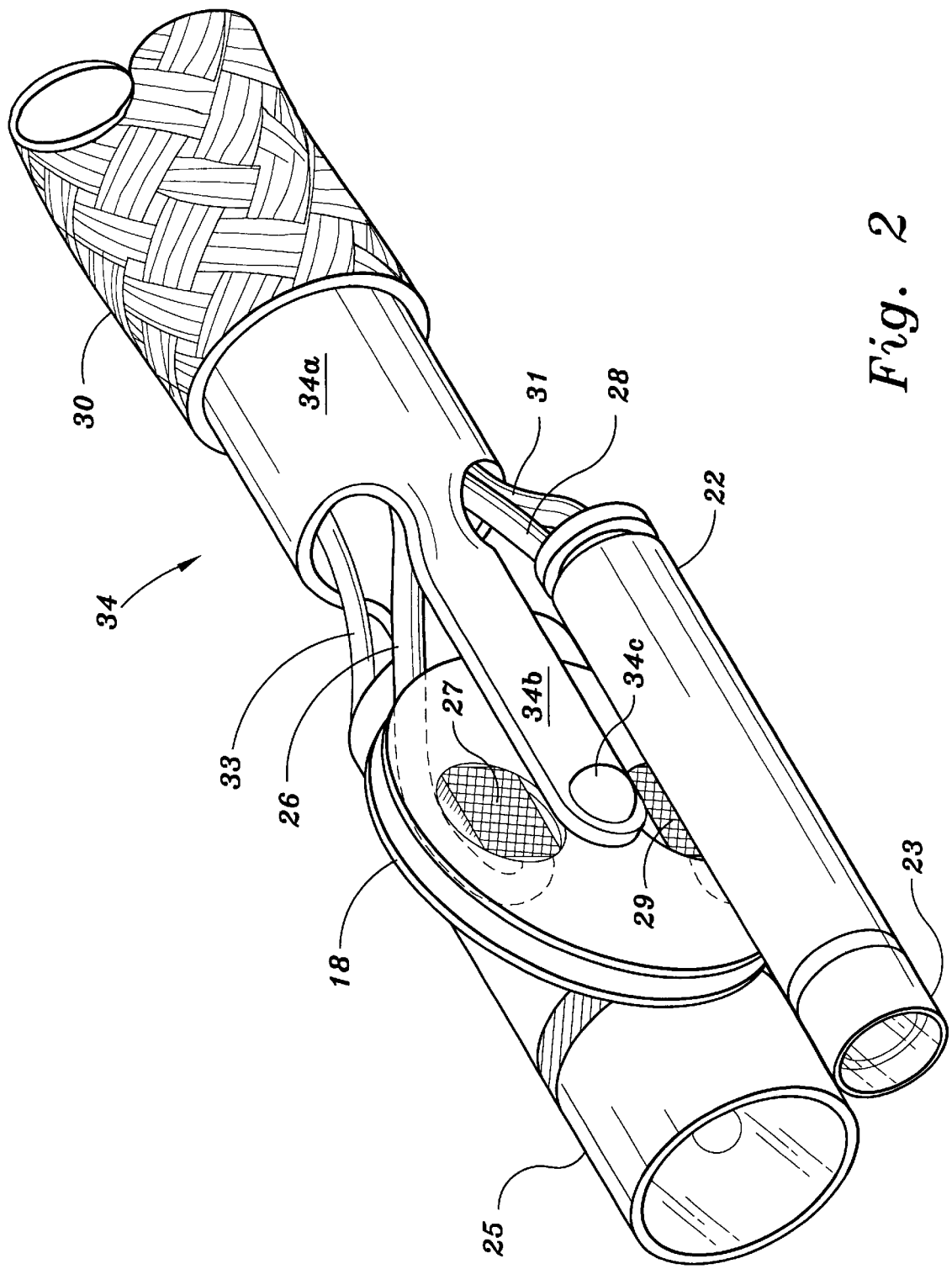
FIG. 2 is a greatly enlarged, partial perspective view of the camera end of the inspection system.

As best seen in FIG. 2, inner wheel 18 is rotatably mounted on a yoke 34. Yoke 34 comprises a short tubular portion 34a having two identical, parallel-spaced legs (only one is shown) 34b extending therefrom. An axle pin 34c is disposed through legs 34b and wheel 18 in conventional fashion so that wheel 18 may rotate on axle pin 34c.

As previously stated, movement of wheel 18 is accomplished by utilizing two control cables 26, 28 having first ends 27, 29 (FIG. 2) fastened to inner wheel 18. The ends are fastened at diametrically opposite positions on wheel 18. Cables 26, 28 are funneled through yoke 34 and an umbilical-type flexible conduit 30. Second ends of cables 26, 28 are fastened to outer wheel 20 in the same manner as the first ends. A control rod 32 is rigidly mounted to outer wheel 20 such that manipulation of control rod 32 will cause rotation of wheel 20. Rotation of wheel 20 will be transmitted via cables 26, 28 to wheel 18, thus causing wheel 18, camera 22, and light 24 to rotate up and down in a 180 degree arc. Horizontal movement is accomplished by simply rotating conduit 30 in the desired direction. Flexible conduit 30 can be of any reasonable length.

With specific reference to FIG. 2, camera 22 is equipped with a removable lens 23. Lens 23 may be removed by unscrewing the same and attaching another lens having more or less acuity as desired. Likewise, front portion 25 of light 24 may be removed for the interchange of a reflector if needed. Control cables 31 and 33, respectively connected to camera 22 and light 24, are bundled through yoke 34 and conduit 30 for connection to camera and light controls (not shown).

The inspection system as described above can easily be positioned with known orientation inside of piping having limited accessibility. It is also probable that the use of dual wheels would permit four-way movement of the camera and light. Lighting intensity can be controlled to inspect the piping in a high quality manner and minute details can be quantified by changing the lens of the camera. It is also contemplated that a fiberoptic light source may be utilized in surrounding or stacked relationship with the camera.

Although directed to a pipe inspection system, it should be recognized that the present invention can be adapted to perform other functions such as search and retrieval of foreign objects from piping, tanks, or other small access areas and delivery of other types of inspection devices such as ultraviolet lighting, ultrasonic transducers, etc. To this end the invention may be inserted into specialized guide tubes that open to accept insertion of the umbilical cord and are then closed to allow the system to be pushed along the inspection guide area.

It is to be understood that the present invention is not limited to the embodiment described above, but encompasses any and all embodiments within the scope of the following claims.

We claim:

1. Apparatus for use in inspecting cavities with limited access such as a boiler feedwater piping system comprising:
    an elongate flexible conduit, said flexible conduit having a distal end and a proximal end;
    a miniature camera positioned at said distal end of said flexible conduit;
    a miniature, variable intensity light source also positional at said distal end of said flexible conduit;
    a yoke supporting the camera and the light source for arcuate movement about a vertical axis;
    a first wheel rotatably mounted to said yoke;
    a plurality of control cables, each of said control cables having a first end fastened to said first wheel.

2. An apparatus as defined in claim 1 wherein said plural control cables extend from said first wheel and are funneled through said yoke and said flexible conduit to said proximal end of said flexible conduit.

3. An apparatus as defined in claim 2 wherein a second rotatable wheel is positioned adjacent said proximal end of said flexible conduit and each cable has a second end fastened to said second rotatable wheel.

4. An apparatus as defined in claim 3 wherein a rod, for imparting rotary movement, is rigidly attached to said second rotatable wheel.

5. An apparatus as defined in claim 2 wherein the miniature camera and the miniature light source are mounted on opposite faces of said first wheel.

6. An apparatus as defined in claim 5 wherein the miniature camera includes means for facilitating lens interchange.

7. An apparatus as defined in claim 6 wherein a cable, for providing control signals, extends from the miniature camera and is funneled through said yoke and said flexible conduit.

8. An apparatus as defined in claim 2 wherein the miniature light source includes means for facilitating reflector interchange.

9. An apparatus as defined in claim 8 wherein a cable, for providing control signals, extends from the miniature light source and is funneled through said yoke and said flexible conduit.

* * * * *